United States Patent [19]

Bukowski

[11] 4,436,369

[45] Mar. 13, 1984

[54] STEREOSCOPIC LENS SYSTEM

[75] Inventor: William A. Bukowski, New York, N.Y.

[73] Assignee: Optimax III, Inc., New York, N.Y.

[21] Appl. No.: 300,255

[22] Filed: Sep. 8, 1981

[51] Int. Cl.³ .................... G02B 27/24; G03B 35/10
[52] U.S. Cl. .................... 350/130; 352/60; 352/62; 352/65; 354/114
[58] Field of Search .................... 350/130–132; 352/60, 62, 65; 354/114, 115, 112, 113

[56] References Cited

U.S. PATENT DOCUMENTS

| 1,909,222 | 5/1933 | Pettie | 352/62 |
| 2,194,737 | 3/1940 | Cathey | 352/60 |
| 2,267,952 | 12/1941 | Sauer | 350/130 |
| 2,737,098 | 3/1956 | Millet | 354/115 |

FOREIGN PATENT DOCUMENTS

| 523690 | 11/1953 | Belgium | 352/60 |
| 533899 | 3/1922 | France | 352/60 |
| 547225 | 12/1922 | France | 352/60 |
| 789755 | 11/1935 | France | 352/60 |
| 879473 | 2/1943 | France | 354/114 |
| 446165 | 4/1936 | United Kingdom | 352/62 |

Primary Examiner—Jon W. Henry
Attorney, Agent, or Firm—Morgan, Finnegan, Pine, Foley & Lee

[57] ABSTRACT

A stereoscopic lens system for simultaneously recording left and right images on longitudinally displaced half-frames of a motion picture film. Left and right images are formed by a pair of adjustable receiving lenses horizontally spaced by the average human interocular distance and vertically spaced by an amount corresponding to the half-frame displacement. Images formed by the receiving lenses are focused onto respective field lenses. These images are in turn directed by front-silvered flat mirrors to the optical elements of a relay lens mounted to the optics body containing the above-described elements. Provision is made for the mounting of accessory receiving lenses and convergence altering optical elements located in front of the receiving lenses.

15 Claims, 8 Drawing Figures

STEREOSCOPIC LENS SYSTEM

FIELD OF THE INVENTION

This invention relates to stereoscopic motion picture photography and, in particular, to an improved stereoscopic lens system capable of photographing a pair of images on cinematographic film which may be projected to give the viewer a three dimensional perception of the original scene.

BACKGROUND OF THE INVENTION

In stereoscopic, or three-dimensional, photography, it is necessary to record simultaneously, images of the original scene taken from two different points of observation. As is well known, the sensation or perception of depth in a person's field of vision results, in part, from the viewer's interpretation of the size of viewed objects and, in part, from the reception of two separate images, one each by the left eye and by the right eye. Because the eyes are spaced apart, each eye views the original image from a different vantage point. The received images are thus different, and these are processed and combined by the brain to provide depth and distance information.

To faithfully reproduce the stereoscopic nature of the original scene by photography requires that separate left-eye and right-eye images be recorded on the film. In early attempts to recreate three dimensional effects by motion picture photography, these separate left-eye and right-eye images were recorded on separate films transported through separate motion picture cameras that were physically spaced apart. The original scenes were then reproduced by running the two films simultaneously through separate motion picture projectors operating in synchronism and casting upon the screen for each frame of film these two images in optical registration. The images projected onto the screen were polarized, so that a viewer wearing polarized glasses would receive the correct image at each eye.

The early results of three-dimensional motion picture photography, using separate cameras to record the original scene on separate films, and then using separate motion picture projectors to recreate the image in the theater, were only marginally successful from a technical point of view. Although the three-dimensional effects were sometimes astounding, watching early stereoscopic films was often uncomfortable to the viewer and gave rise to eye strain. The images were not sharp and clear, for it was operationally impossible to maintain proper registration and synchronism in recreating the orignal scene by projection.

More specifically, perfect reproduction required not only that the two films be running at precisely the same speed, but also that each frame pair be passing through the projection gate at the same instant of time and that the projected images be in focus and aligned both vertically and horizontally. It is not surprising that all of those conditions were rarely, if ever, met. As already noted, the end result was pronounced discomfort of the viewer due to the changing and erratic nature of the perceived left and right images.

In an effort to overcome the aforementioned difficulty of obtaining synchronized and registered images from separately projected films, more recent stereoscopic motion picture cameras have utilized a different film format. In the newer systems, the left and right images are recorded on a single film in different frames or frame areas. One such format that is generally preferred over others is one in which the corresponding left and right images of each action frame are recorded in adjacent longitudinal halves (i.e., normally the vertical halves) of a bisected 35 mm. film frame. This means that in the customary 35 mm. format in which a frame extends for a longitudinal distance corresponding to four perforations, each half-frame will be two perforations in length or pitch. With the left and right ocular images recorded in this manner, the half-frames have a narrow longitudinal dimension and a wide lateral dimension. This format produces half-frames having an aspect ratio of 2.35:1, which is advantageous because that aspect ratio corresponds to the one customarily used for wide-screen Cinemascope.

The optical systems for recording scenes in the above format consist of a pair of receiving lenses that are spaced apart by a distance corresponding to some standard or average spacing between the left and right eyes of the viewer. Thus, the left receiving lens receives images that would normally be seen by the left eye, and the right receiving lens receives images that would normally be seen by the right eye of an observer. Both receiving lenses in the prior art optical apparatus of which we are aware arranged on a common horizontal plane (as are an observer's eyes). At the interior of the optical apparatus, the left and right images are redirected by optical means to the motion picture camera or camera lens to form the photographic images on the film, as described above.

Where, as in the case of the above-described photographic apparatus, the receiving lenses are spaced apart along a common horizontal plane, it is necessary to rearrange these images so that they fall on adjacent longitudinally displaced areas to the film. This requirement is in addition to that of redirecting the left and right images so that they are laterally centered on the film. The longitudinal displacement of the two ocular images is usually done by prisms. The disadvantage in doing this is that the image must pass through several optical interfaces (i.e., the interface between the optical element and air or adjacent optical element). This results in a loss of image intensity and a loss in image sharpness. Image intensity is lost with each passage through an optical interface because a small portion of light is reflected at each interface and therefore not transmitted to the next segment or element of the optical system. Image sharpness is lost in prisms due to unavoidable diffraction in passing through two or more pristatic elements.

SUMMARY OF THE INVENTION

In the present invention, the receiving optical elements are longitudinally displaced by an amount corresponding to the approximate distance between adjacent half frames on the film strip, and both the left ocular image and the right ocular image are redirected by highly efficient reflective surfaces to a lens system for transmitting the superposed images to the photographic film gate. To that end, field lenses intermediate the image-reflecting system and the receiving lenses form the corresponding ocular images that are to be transmitted to the camera. These field lenses preferably are arranged so that their optical centers are substantially (but not necessarily precisely) coaxial. Because the photographic apparatus of the present invention employs highly reflective flat surfaces for transferring the images to the film, image sharpness and brightness are superior to that obtained with stereoscopic lens systems using prismatic elements and horizontally aligned receiving lenses.

Other features of the invention, such as the ability to change the interocular spacing, focusing, image alignment, etc., will be better appreciated from the following detailed description and the drawings.

DESCRIPTION OF PREFERRED EMBODIMENT

Figure 1:
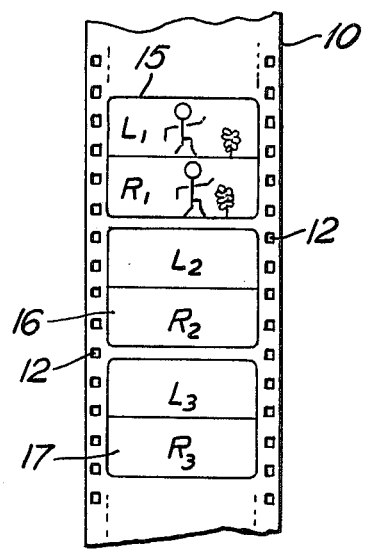
FIG. 1 is a schematic representation of the film frame format recorded with the stereoscopic lens system of the invention.

Referring first to FIG. 1, a standard 35 mm. motion picture film is shown with three representative photographic frames recorded thereon. The film 10 is conventional in all respects, containing preforations 12 at the margins. The recorded frames 15, 16 and 17 have conventional spacing for 35 mm. motion picture film. As such, the longitudinal dimension of each frame corresponds to four film perforations. Each of the frames consists of two image segments: a top half-frame recorded with a left ocular image (L) and a lower half-frame recorded with a right ocular image (R) of the same scene. The individual frames, as well as the left and right ocular images, are longitudinally displaced along the length of the film.

In FIG. 1, it is assumed for simplicity of explanation that the frames 15, 16 and 17 are recorded in sequence at the customary 24 frames per second. The two segments of each frame are recorded simultaneously so that, for example, the images contained in half-frames (L, R) of frame 15 represent the left and right ocular images of a scene as would be viewed by an observer standing behind the lens system which recorded the scene. Similarly, the following frame 16 contains left and right images (in segments L₂, R₂) as would be viewed by the left eye and right eye of the observer of the scene in the following one twenty-fourth second.

Stick-figure images have been shown in the frame 15 for purposes of illustration. It is seen from these images that each image is of the same height and bears the same longitudinal (i.e., vertical) relationship to the half-frame area. However, the two images are laterally displaced, and the respective distances between the human figure and the flower are unequal. These image differences correspond to the differences in images as would be received by the left and right eye of an observer in the position of the camera recording the scene, and account for the stereoscopic or three-dimensional effect when the film is projected.

During projection the left and right half-frames are projected through the same projector with polarized light. For example, one image may be projected with vertical polarization, while the other is projected with horizontal polarization. Viewers in the audience wear glasses whose lenses are similiarly polarized to permit each eye to see only the correct left or right image reflected from the viewing screen.

Figure 2:
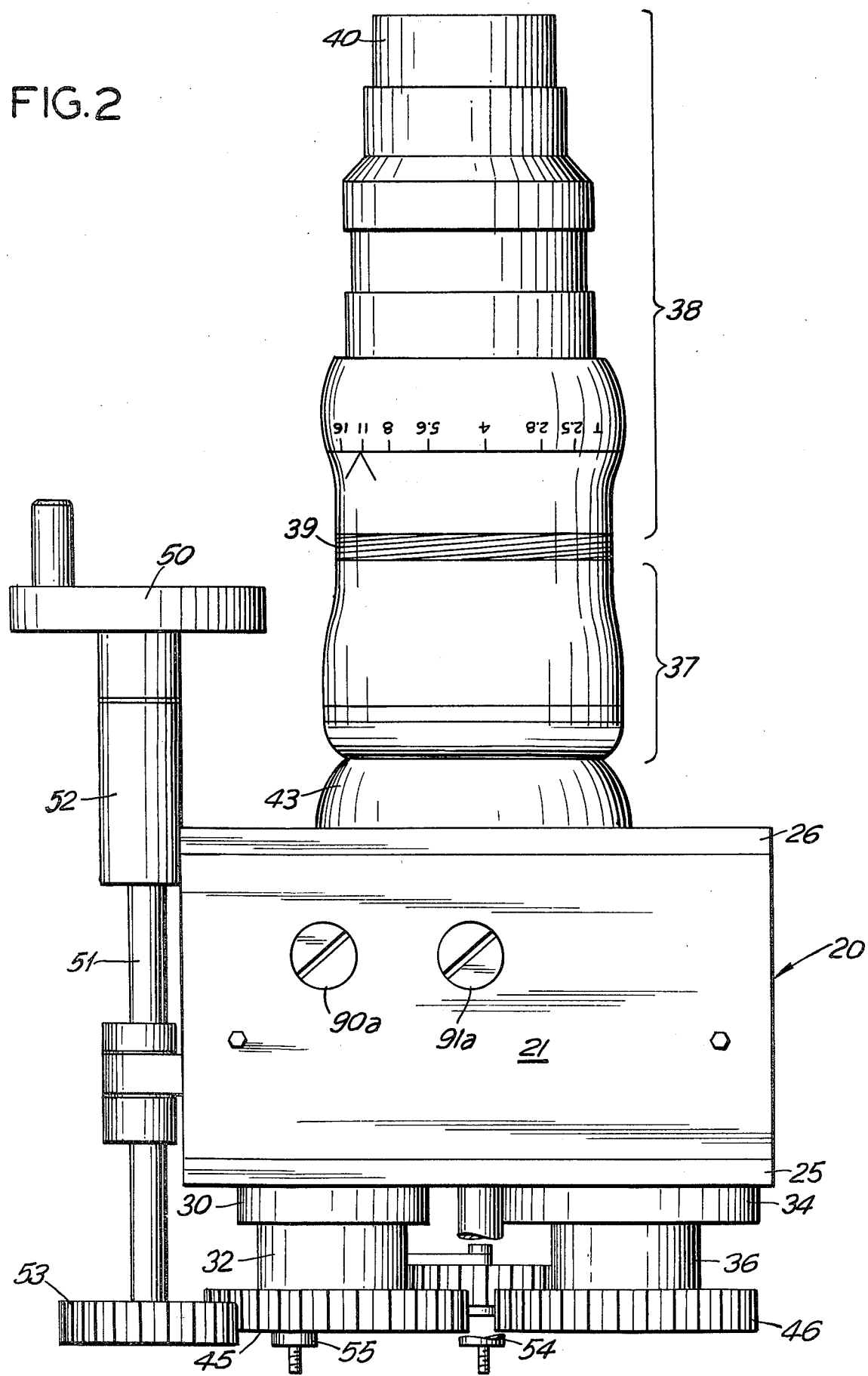
FIG. 2 is a plan view of the lens system.

The stereoscopic lens system and associated apparatus (excluding the motion picture camera) are shown in the top view of FIG. 2. The unit is completely self-contained and comprises a hollow, rectangular body 20 constructed from a plurality of 6 mm aluminum plates, i.e., top plate 21, front lens mounting plate 25, back plate 26, bottom plate 22 (FIG. 4) and side plates 23, 24. The body measures 80 mm front-to-back, 140 mm. wide and 83 mm. high. The lens mounting plate 25 forms the support for a fixed lens mount 30 carrying the right receiving element, i.e., lens 32, and a adjustable lens mount 34 carrying an identical left receiving element, i.e., lens 36. Each of the receiving lenses is a 32 mm. Angenieux S2 lens. For purposes of clarity the first optical elements 32a, 36a of the receiving lenses are shown, but it should be understood that no effort has been made to accurately illustrate these commercially available lenses.

Mounted to the back plate 26 is a relay lens arrangement comprising two 100 mm. Kinoptik motion picture lenses 37, 38 secured face-to-face. The first lens 37 of the relay is affixed to the body 20 of the lens system without the customary camera mount. The second lens 38, separated from the first by a filter holder 39, comprises the entire conventional motion picture lens terminating in a camera mount 40. This is a standard camera mount that is received by the face of the motion picture camera. The manner of mounting the relay lens to the body 20 can be seen in FIG. 4.

Figure 4:
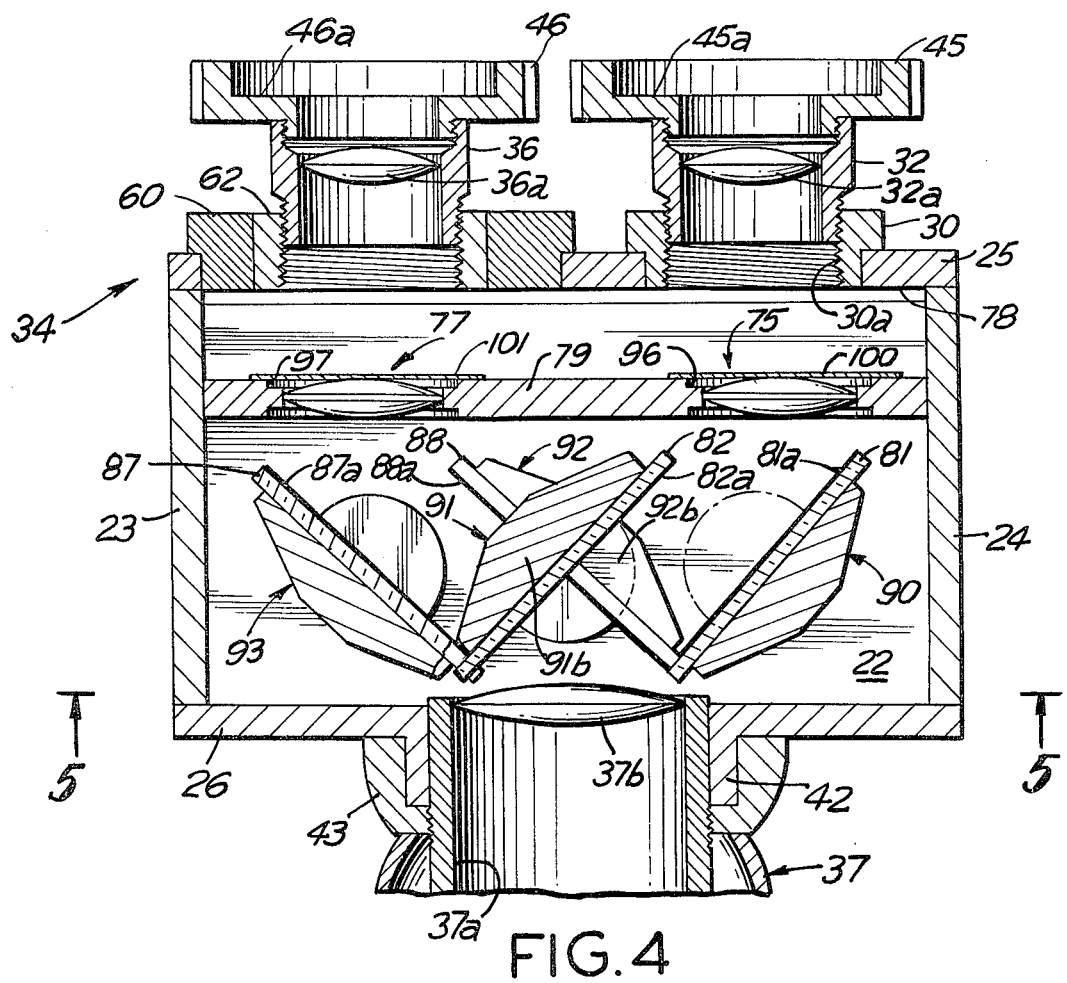
FIG. 4 is a plan view of the system in partial cross-section to reveal the interior optical elements.

Referring momentarily TO FIG. 4, the back plate 26 is formed with a cylindrical sleeve 42 which is dimensioned to slidably accept the forward segment of the threaded barrel 37a of the Kinoptik lens. An interiorly threaded lens brace 43 screwed onto the lens barrel is positioned such that the first optical element 37b of the relay lens is aligned with the interior surface of the back plate. Brace 43 is secured to the body by set screws (not shown) which extend through the brace and engage the sleeve 42, thereby affixing the 1:1 relay lens arrangement to the lens system body 20.

Figure 3:
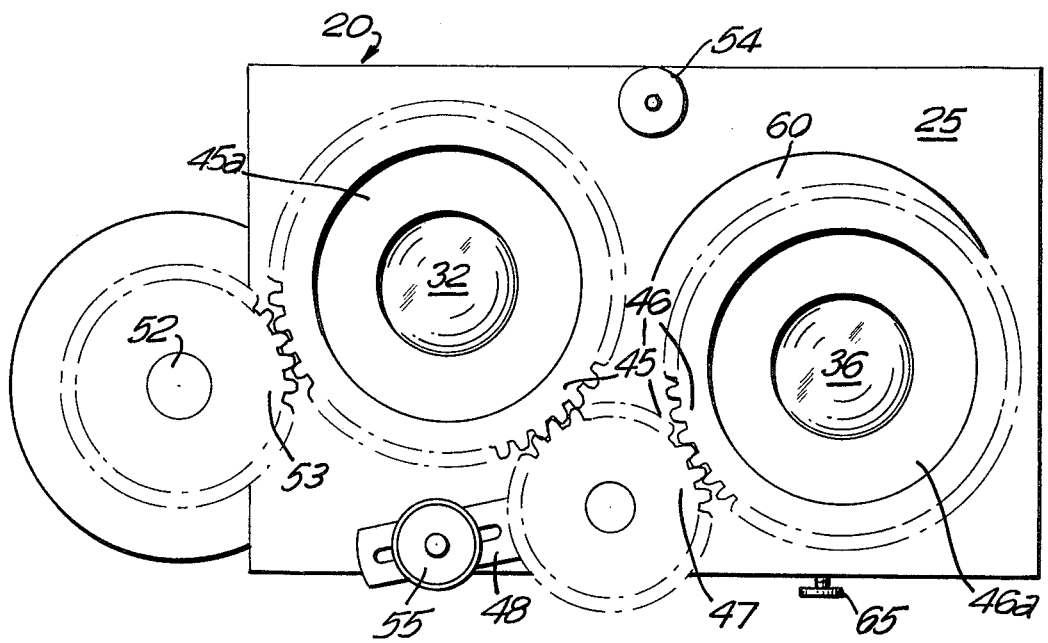
FIG. 3 is a front elevation view of the system.

Referring to FIG. 3, receiving lens 32, 36 are focusable in unison by turning the lenses on their mounts. Each receiving lens 32, 36 is provided with a threaded 45-tooth spur gear, 45, 46 screwed onto the lens accessory threads to affix the gear to the front of the lens. A 26-tooth spur gear 47 carried by a mounting bracket 48 is freely rotatable and engages gears 45 and 46. Rotation of the lens gear 45 causes rotation of the intermediate idler gear 47 which, in turn, drives lens gear 46. As will be explained shortly in more detail, rotation of the lens gears causes the receiving lenses to move toward or away from the body 20. This changes the optical distance between the receiving lens elements and the optical elements at the interior of the body and thereby alters the focus of the received images.

As observed in FIG. 2, focusing is accomplished by turning a focus crank 50 and its attached shaft 51, the latter being journaled for rotation in a bracket 52 secured to the right side of the body. A 30-tooth spur gear 53 at the forward end of the shaft 51 is in engagement with the right lens gear 45. Turning the crank 50 thus rotates the gear 53 which, in turn, drives lens gear 45, idler gear 47 and lens gear 46.

The front plate 25 of the body is provided with a pair of accessory plate mounts (FIG. 3), one mount 54 centered near the top edge of the front plate and a second mount 55 projecting forwardly from underneath the right receiving lens. Bracket 48 is secured to this lower mount 53. These mounts are also used to accept accessories such as optical wedges (not shown) for altering image convergence.

One feature of the invention is that one of the receiving lenses, in this case the left receiving lens 36, is longitudinally (vertically) displaced from the other receiving lens. The amount of displacement corresponds generally to the dimensional displacement between adjacent half-frames on the film. Specifically, this displacement is 13 mm.-14 mm. The horizontal displacement between the optical centers of the receiving lenses is adjusted to correspond to the average interocular distance between the left and right eyes. Such distance is nominally about 65 mm. This interocular spacing can be changed, however, in order to reduce or enhance the stereoscopic effects. For that reason, the left receiving lens is supported by the adjustable mount 34, the details of which are shown in FIGS. 7 and 8.

Figure 7:
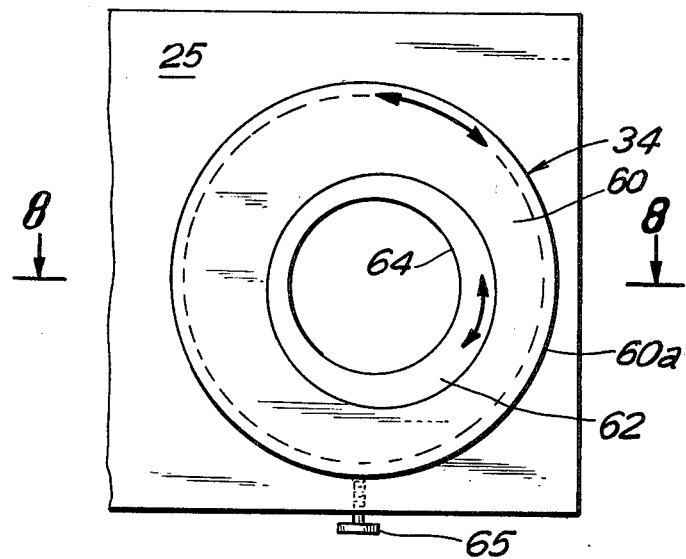
FIG. 7 is a front elevational view of the lens mount for the left receiving lens.
Figure 8:
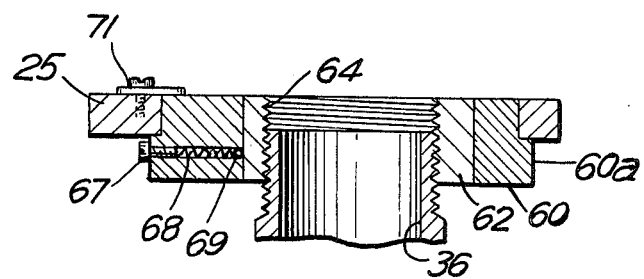
FIG. 8 is a cross-sectional view of the lens mount, taken along the line 8—8 in FIG. 7, and also shows a portion of the receiving lens.

Turning to FIGS. 7 and 8, the adjustable mount 34 includes a large eccentric element 60, rotatably journaled in the front plate 25. Element 60 includes a flange portion 60a, as shown in cross-section in FIG. 8. Slidably received for selected rotation in the eccentric aperture of the element 60 is a second, smaller eccentric element 62. The small element 62 has an aperture 64 therethrough which is eccentrically located relative to the axis of rotation of the element 62. This aperture 64 is threaded to accept the threads on the barrel of the receiving lens 36 (illustrated partially in cross-section in FIG. 8).

Owing to the double-eccentric effect of the elements 60, 62, the lens mounting aperture 64 may be horizontally and vertically adjusted relative to the front plate 25 and therefore relative to the right receiving lens in order to alter the interocular spacing as well as the vertical displacement. By and large, the vertical displacement remains fixed, inasmuch this dimension is dictated by the film frame format. The interocular spacing, however, may be adjusted by turning the large eccentric element 60 to move the small eccentric element 62 (and thereby the lens held by its mounting aperture 64) horizontally toward or away from the right receiving element. Since this also alters somewhat the vertical location of the lens, the small eccentric element 62 is turned in order to restore the lens 36 to its original vertical location.

Once the desired interocular spacing has been set, the double-eccentric mechanism may be locked in place by tightening the set screw 65 (FIG. 7) at the bottom edge of the front plate 25. This locks the large eccentric element in place. Next, the small eccentric element 62 is fixed by tightening screw 67 (FIG. 8), which applies pressure through a spring 68 to a small ball check 69 engaging the perimeter of the element 62. The large eccentric 60 is retained in the front plate by a locking ring 71 (FIG. 8) or other suitable locating means at the interior of the body.

FIG. 4 is a top view in cross-section through the interior of the optics body. Directing attention first to the right receiving lens, the mount 30 includes an interiorly threaded sleeve 30a extending through the front plate 25 into which the barrel of receiving lens 32 is screwed. When gears 45, 46 are turned to focus the receiving lenses, the lenses turn in the threaded mounts, and it is this mechanical action which causes them to move forwardly or rearwardly to focus the incoming images onto right and left interior field lenses, 75, 77, respectively. To avoid spurious reflections, the gears 45, 46 have recessed front faces 45a, 46a, and these faces are coated with black, light absorbent paint. Also, the front interior surface is provided with a 2 mm. thick light trap 78, and all interior surfaces are coated with black light absorbent paint.

Figure 5:
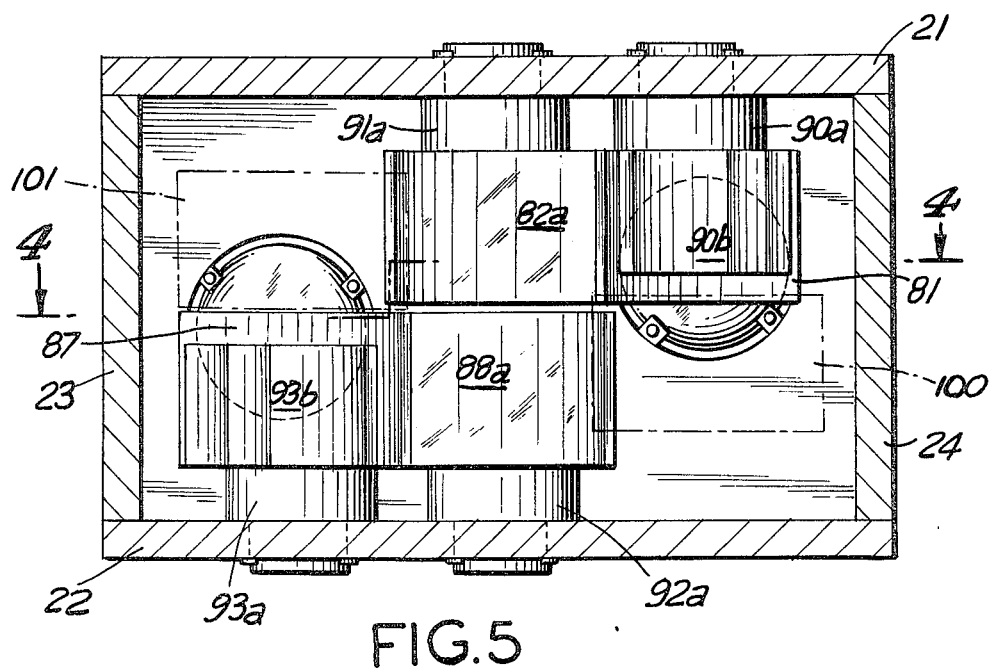
FIG. 5 is an elevation view in partial cross-section taken generally along the lines of 5—5 of FIG. 4.

The field lenses are fixedly mounted in a vertical plate 79 which, in turn, is secured to the body. Each field lens comprises a pair of plano-convex lenses, spaced apart by 0.15 mm. and each having a focal length of 99 mm. The optical centers of these lenses are approximately (but not necessarily precisely) coaxial with the optical centers of the receiving lenses. Their positions in the optics body relative to the other elements are outlined in phantom in FIG. 5. In practice, the optical centers of the field lenses are about 1-2 mm. to the outside and displaced slightly upwardly and slightly downwardly of the optical centers of the right and left receiving lenses, respectively.

It is another feature of the invention that the image formed on the right field lens 75 by lens 32 is passed to two highly reflective mirrors 81, 82 comprised of optical flats front-coated with a highly reflective silver film 81a, 82a and angled at 45° relative to the lens axis. The images reflected from the silvered mirror surfaces are directed to the first optical element of the relay lens schematicaly represented by a conventional double-convex lens 37b. In a similar manner, the image focused onto the left field lens 77 by receiving lens 36 is directed by the 45° angled mirrors 87, 88, similarly front-coated with silver film 87a, 88a. The result of this arrangement is that the left and right images are directed to the optical image plane of the lens 37b in lateral registration, but without the need for any substantial longitudinal redirection of the images. Accordingly, image distortion is minimized.

The four angled mirrors are positionally and firmly secured to the optics body so as to be substantially free from vibration by means of stout machined aluminum mounts 90-93. Each mount includes of a cylindrical mounting shaft 90a-93a, of which a narrowed section extends through one of the top and bottom plates. Integral trapezoidal mirror supports 90b-93b provides flat areas to which the mirrors are cemented. Mirror mounts 90, 91 are suspended from the top plate 21, whereas mirror mounts 92, 93 are supported in the bottom plate 22. This arrangement is best viewed from the interior elevational view of FIG. 5. The optical path between each of the field lenses and the lens element 37b in the optical plane of the rear of the body is 75 mm. This is the distance equal to the optical distance the corresponding element of the second relay lens 38 and the film.

Figure 6:
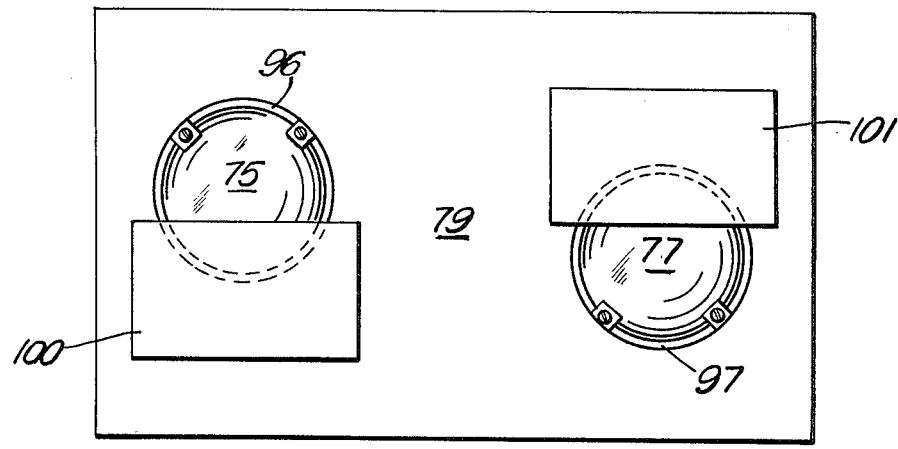
FIG. 6 is front elevation view of the field lenses and associated mounting plate used in the lens system.

FIG. 6 is a somewhat more detailed elevational view of the field lens assembly. As can be seen from FIGS. 4 and 6, the field lenses are received in apertures in the mounting plate 79. Recesses 96, 97 are machined into the mounting plate 79 at the periphery of the apertures to accomodate a plurality of small nylon mounting blocks 98, 99 on either side of the recesses. These are fastened to the mounting plate to apply gentle pressure to the field lenses to maintain them securely mounted.

Shims (not shown) between the plane surfaces of the field lenses establish the desired 0.15 mm. spacing.

The view of FIG. 6 is from the front of the lens system, looking into the apparatus from the receiving lenses. The field lenses are, as already noted, offset so that their optical centers correspond approximately to the optical centers of the receiving lenses. The field lens mounting plate measures 70 mm. × 121 mm., and each of the field lenses is approximately 27 mm. in diameter. Each field lens is located to have its periphery approximately 16 mm. from the nearest side edge of the mounting plate and 11 mm. from the nearest top or bottom edge of the mounting plate.

An optically black masking strip 100 masks out the lower portion of field lens 75; a similar masking strip 101 masks out the upper segment of field lens 77. The upper and lower edges of these masking strips, respectively, form the division line between the upper and lower half-frames on the film strip. Their precise positions relative to the optical centers of the field lenses may be determined empirically to obtain the desired image division.

From the foregoing it will be seen that the invention provides a stereoscopic motion picture lens system utilizing a single camera. Adaptable to most 35 mm. cameras, the system has focal length capabilities of 16 mm., 24 mm., 32 mm., and 64 mm. by one of several lenses fitted onto the front of the receiving lenses.

The primary receiving elements are two lenses positioned at the average human interocular separation of 65 mm., thus simultaneously recording a right eye and a left eye image on a single frame of film. The frame is bisected horizontally; the two images are two perforations high and the width of the frame area in length, forming (when juxtapositioned in projection) a field with an aspect ratio of 2.35:1.

The system overall is roughly the size and weight of a 20-120 mm. zoom lens. This relatively small mass offers the film maker the opportunity to shoot a three dimensional film with the same freedom available in "normal" cinematography, including hand-held, Steadicam, Tylermount, etc. Convergence can be aligned to any point in the scene, thus facilitating the total control of the "effects illusion".

Because the two separate images are recorded simultaneously, it is possible to project the footage filmed by the lens system in a "flat" non-three-dimensional format, thus making the film suitable for television presentation.

Convergence adjustment is possible by the use of optical wedges (not illustrated) mounted to a frame supported in front of the receiving elements. As is well known, such wedges comprise thin lenses which are wedge-shaped in cross-section (e.g., 1°–3°) so that they are thinner at one portion of the periphery than they are at a diametrically opposite portion of the periphery. When these wedges are mounted in front of the receiving lenses, the incoming image is refracted slightly so as to appear to come from a different point in the scene. By rotating the wedges, this convergence can be both vertical and horizontal for maximum versatility.

Although the invention has been described with reference to one preferred embodiment, it should be understood that certain modifications and variations can be incorporated without departing from the fundamental concepts embodied therein. Thus, different focusing and interocular adjustment mechanisms can be used to alter the axial positions of the field lenses, the shape of the optics body can be altered, and various optical lengths and lenses can be used. It will furthermore be understood that the lens system of the invention may be adapted to any conventional camera.

What is claimed is:

1. A stereoscopic lens system for attachment and use with a motion picture camera device for simultaneously forming left and right images of a viewed scene on an optical plane for recording pairs of such left and right images in successive frame areas of a motion picture record medium carried by the camera device, comprising:

an optics body;

a pair of focusable optical image receiving lens elements carried by said body and being laterally spaced apart by an interocular distance and vertically displaced by an amount corresponding to the pitch between adjacent longitudinally displaced halves of the frame areas on the record medium to be recorded;

a relay lens mounted to said optics body and adapted for removable mounting to the motion picture camera device;

field lens means at the interior of said body and optically spaced from the receiving elements near the image plane thereof so as to form respective left and right focused images;

masking means in the respective optical paths for said right and left images for establishing a division line between said images along adjacent lateral edges thereof within the frame area;

reflecting element means at the interior of said body and located intermediate said field lens means and said optical plane for directing said left and right images from said field lens means simultaneously to said relay lens such that said simultaneous images, as presented to said relay lens for transmission to the plane of the record medium, are generally in lateral registration and longitudinally superposed in an area corresponding to a single frame of the record medium to be recorded.

2. The stereoscopic lens system of claim 1, further comprising:

focus means for synchronously altering the optical distance between each of said receiving elements and said field lens means, to enable the in-focus image plane of the viewed scene to be maintained substantially at the plane of said field lens means.

3. The stereoscopic lens system of claim 1, further comprising:

adjustable mounting means associated with at least one of said receiving elements for selectably changing said interocular distance substantially independently of said vertical displacement.

4. The stereoscopic lens system of claim 1, wherein:

said reflecting element means comprise for at least one of said images a pair of front-coated reflective optical flats angled to direct said image to said relay lens in substantial lateral registration with the other of said images.

5. The steroscopic lens system of claim 4, wherein said reflecting element means comprises:

a mirror mount secured to said optics body for supporting each coated optical flat so as to be substantially free from vibratory movement.

6. The stereoscopic lens system of claim 5, wherein:

each pair of mirror mounts supportively extends from opposed surfaces of said body.

7. The stereoscopic lens system of claim 2, wherein said field lens means comprises:
   a pair of field lenses vertically displaced from each other so that each is nominally aligned on optical centers with a respective receiving element,
   each field lens comprising a pair of spaced plano-convex lenses; and
   field lens mounting means for fixedly locating said field lenses at the body interior intermediate the receiving elements and the mirror means.

8. The stereoscopic lens system of claim 1, wherein:
   said masking means associated with said right and left images are located in the respective image planes for said focused images.

9. The stereoscopic lens system of claim 1, wherein:
   said relay lens means is adapted for mounting to a motion picture camera to record said pairs of superposed images in single frames of a photographic film.

10. The steroscopic lens system of claim 1, further comprising:
    image convergence means adapted for support by said optics body to alter the apparent angular position of images of the viewed scene presented to said receiving elements.

11. The stereoscopic lens system of claim 10, wherein:
    said image convergence means comprises at least one optical wedge and means for fixedly supporting said wedge fowardly of a receiving element.

12. A stereoscopic lens system, for attachment to a motion picture camera device, for simultaneously forming superposed, laterally aligned images for recording in successive frames of a motion picture record medium; comprising:
    an optics body;
    left and right receiving lenses mounted to said optics body;
    said left and right receiving lenses being laterally spaced by an interocular distance corresponding to the nominal human eye interocular distance, and being longitudinally displaced by a distance corresponding to the approximate pitch of such superposed images;
    optical image-directing means at the interior of the optics body for laterally redirecting focusable left and right images presented by said receiving lenses to an optical plane in lateral registration and in superposed, non overlapping relation within an area corresponding to a single picture frame of the record medium to be recorded,
    said optical image-directing means being operative so as to avoid any substantial longitudinal redirection of the respective left and right images;
    relay lens means associated with said optics body for transmitting said superposed laterally registered images to a frame area of an image plane on the record medium; and
    means for removably attaching said associated relay lens means and optics body to the motion picture camera device.

13. The stereoscopic lens system of claim 12, wherein said optical image-directing means includes:
    means for forming a focused image at the interior of the optics body for transmission by said relay lens to said image plane at the record medium.

14. The stereoscopic lens systems of claim 13, wherein:
    said reflecting means for each image comprises at least one optical flat having a silvered coating on the front surface thereof.

15. The stereoscopic lens system of claim 12, further comprising:
    masking means in the respective optical paths for said images for masking said focused images presented to the relay lens such that a non-overlapping line of division is established between said superposed images in said single frame area.

* * * * *